United States Patent
Fahrendorff et al.

(10) Patent No.: US 11,777,755 B2
(45) Date of Patent: Oct. 3, 2023

(54) ELECTRONIC COMMUNICATION METHODS AND SYSTEMS FOR COLLABORATING AND COMMUNICATING IN MEETING ENVIRONMENTS

(71) Applicant: Mitel Networks (International) Limited, London (GB)

(72) Inventors: Anders Fahrendorff, Ottawa (CA); Darren Mombourquette, Nepean (CA); Mona Abou-Sayed, Frisco, TX (US); Logendra Naidoo, Ottawa (CA)

(73) Assignee: Mitel Networks Corporation, Ontario (CA)

( * ) Notice: Subject to any disclaimer, the term of this patent is extended or adjusted under 35 U.S.C. 154(b) by 0 days.

(21) Appl. No.: 16/989,619

(22) Filed: Aug. 10, 2020

(65) Prior Publication Data

US 2021/0058263 A1 Feb. 25, 2021

Related U.S. Application Data (60) Provisional application No. 62/922,710, filed on Aug. 23, 2019.

(51) Int. Cl.
| | | |
|---|---|---|
| *H04L 12/18* | (2006.01) | |
| *H04L 29/08* | (2006.01) | |
| *H04L 67/306* | (2022.01) | |
| *H04L 67/50* | (2022.01) | |

(52) U.S. Cl.
CPC ...... *H04L 12/1831* (2013.01); *H04L 12/1818* (2013.01); *H04L 12/1822* (2013.01); *H04L 67/306* (2013.01); *H04L 67/535* (2022.05)

(58) Field of Classification Search
CPC ............ H04L 12/1831; H04L 12/1818; H04L 12/1822; H04L 67/22; H04L 67/306
See application file for complete search history.

(56) References Cited

U.S. PATENT DOCUMENTS

| | | | |
|---|---|---|---|
| 7,937,287 B2 | 5/2011 | Gaia et al. | |
| 8,958,828 B2 * | 2/2015 | Zheng | .................. H04W 4/185 455/456.4 |
| 9,516,101 B2 * | 12/2016 | Acosta Amador | .... H04L 67/306 |
| 9,754,243 B2 * | 9/2017 | Goldsmith | ......... G06Q 10/1095 |
| 10,171,525 B2 | 1/2019 | Baughman et al. | |
| 10,275,203 B2 * | 4/2019 | Sridhar | ............... H04L 12/1822 |
| 10,503,826 B2 | 12/2019 | Woods | |
| 11,025,685 B2 * | 6/2021 | Levine | ..................... H04N 7/15 |
| 2005/0131714 A1 * | 6/2005 | Braunstein | ............. G06Q 30/02 709/204 |
| 2016/0132776 A1 * | 5/2016 | Yang | ...................... G06Q 30/02 706/46 |
| 2016/0277242 A1 * | 9/2016 | Sallam | ................ H04L 12/1831 |
| 2018/0082263 A1 | 3/2018 | Michels | |
| 2019/0279619 A1 | 9/2019 | Krasadakis | |
| 2020/0186375 A1 * | 6/2020 | Faulkner | ............. H04L 12/1822 |
| 2020/0204390 A1 * | 6/2020 | Bekampis | ............. H04L 67/306 |

\* cited by examiner

*Primary Examiner* — Nazia Naoreen (57) ABSTRACT

A system and method for determining and applying habits during a communication are disclosed. The habits can be used to automatically connect a user to a communication and/or to modify settings for a communication during the communication.

19 Claims, 3 Drawing Sheets

ELECTRONIC COMMUNICATION METHODS AND SYSTEMS FOR COLLABORATING AND COMMUNICATING IN MEETING ENVIRONMENTS

CROSS-REFERENCE TO RELATED APPLICATION

This application claims the benefit of U.S. Provisional Application No. 62/922,710, filed Aug. 23, 2019, and entitled METHODS FOR COLLABORATING AND COMMUNICATING IN MEETING ENVIRONMENTS, the contents of which are hereby incorporated herein by reference, to the extent such contents do not conflict with the present disclosure.

FIELD OF THE INVENTION

The present disclosure generally relates to electronic communication methods and systems. More particularly, examples of the disclosure relate to electronic communication methods and systems suitable for determining participant habits and applying a habit during the electronic communication.

BACKGROUND OF THE DISCLOSURE

Computers and personal devices, such as smartphones, typically comprise software applications (or apps) enabling the user of such devices to better interact and manage gatherings with people through functionality that is designed to take notes, schedule events, and communicate with others. Some of these traditional applications include scheduling and calendar-related programs, programs for tracking tasks/goals, address-book programs to record contact information, programs to send instant messages (i.e., chat), and programs to send and receive electronic mail (i.e., e-mails). Common applications include Mitel® MiCollab, Google™ Calendar, Google™ Mail, Microsoft™ Project™, and Microsoft™ Outlook™.

Users of mobile devices or smartphones, for example, frequently desire to interact and collaborate with other users on different devices and/or using different applications. This creates a desire for a seamless user-experience using software that gives everyone a chance to interact. This means the sharing or delivery of content online during meetings can happen, provided the devices (such as a mobile phone) can run the functional software, such as a specific communication or collaboration application or even a web browser. Users within an enterprise, such as a typical business office, often desire to schedule meetings with others irrespective of the device they may be using (for example, an employee using a smartphone conferences in a user on their laptop). The advent of mobile devices or smartphones created additional opportunities to generate useful metrics that can be used to understand how users interact with their devices and related services. Metrics, such as what users are up to before a meeting starts, a duration and timing of distractions (for example, standing in line at a coffee shop) related to their devices, are examples of how users' habits are reflected by the devices users interact with.

Additionally, more demands are being placed on corporations and management in general to improve effectiveness of meetings, meeting presenters, and meeting participants. Furthermore, the advent of social media techniques used to interact with users online (e.g., liking, sharing, commenting, etc.), the popularity of video game approaches away from the games themselves, and the delivery of online media more recently (i.e., YouTube™, Netflix™, etc.) is leading to a more experienced digital culture, leading to a desire for greater functionality during collaboration meetings. As a result, meeting participants may expect more from electronic meetings.

However, the more complex the interactions between users at a workplace become, the greater demand there is for applications to embody more advanced capabilities (other than simply communicating or booking meetings with another). Further, as applications become more complex, a user may be requested to enter additional information. Further, various functions or features for a communication may need to be or may desirably be selected. Entry of such information can be time consuming and unwanted.

Accordingly, improved methods and systems for facilitating communication and collaboration during an electronic communication are desired. Any discussion of problems and solutions involved in the related art has been included in this disclosure solely for the purposes of providing a context for the present invention and should not be taken as an admission that any or all of the discussion were known at the time the invention was made.

BRIEF DESCRIPTION OF THE DRAWING FIGURES

Subject matter of the present disclosure is particularly pointed out and distinctly claimed in the concluding portion of the specification. A more complete understanding of the present disclosure, however, may best be obtained by referring to the detailed description and claims when considered in connection with the drawing figures.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION

The description of various embodiments of the present disclosure provided below is merely exemplary and is intended for purposes of illustration only; the following description is not intended to limit the scope of an invention disclosed herein. Moreover, recitation of multiple embodiments having stated features is not intended to exclude other embodiments having additional features or other embodiments incorporating different combinations of the stated features.

The present disclosure relates generally to electronic communication methods and systems. Exemplary electronic communication methods and systems can be used to, for example, facilitate electronic communication with one or more participants by determining habit information for at least one participant and using the habit information to automatically perform a function associated with the communication.

Examples of the disclosure can be used in connection with a variety of applications, including, for example, meeting or event scheduling applications, meeting participation in a collaborative setting, project management, such as tracking tasks and their outcomes, media-stream quality during a meeting, the determination and sharing of highly relevant content, content transcription, autonomous creation of information, meeting and meeting facilitator evaluation, gamification concepts applied to a meeting setting, the autonomous creation of meetings, detection of workplace requirements, workload balancing for meeting participants, facilitation of meeting contributions, virtual meeting attendance, generating productivity during meetings, gathering metrics during a meeting, detecting content and contribution redundancy, meeting avoidance, ways to make more effective meetings, pre-meeting simulation and evaluation, dealing with meeting distractions, social media in the workplace, dynamic status detection, and graphical representations of meeting activities.

Several embodiments are disclosed herein that describe systems, methods, and computer program software products for managing events in time-management or event-scheduling applications, such as calendar-related applications. Such embodiments include methods to detect, generate and/or analyze event participant habits; and to facilitate interaction between meeting attendees, including communication and sharing content.

Figure 1:
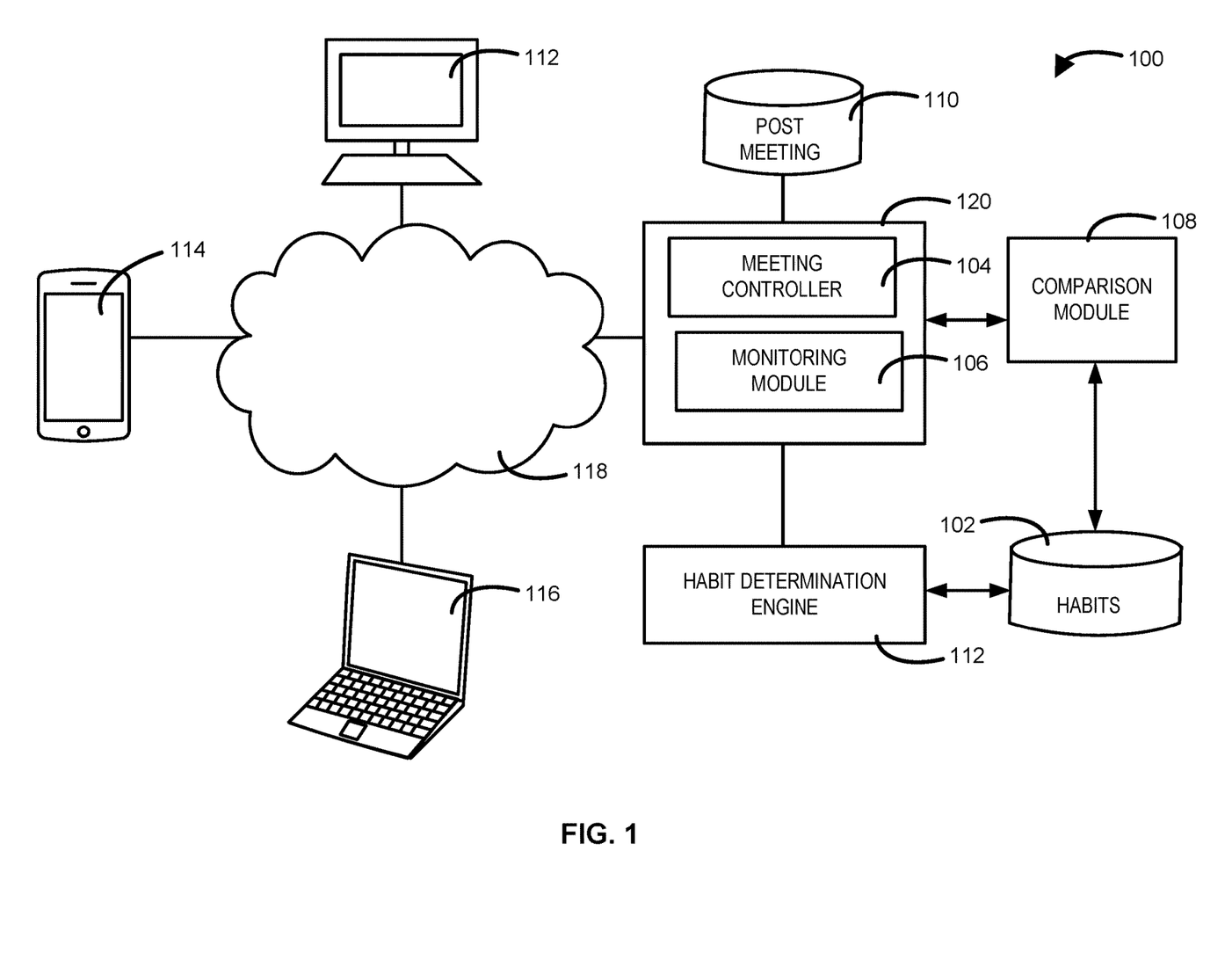
FIG. 1 illustrates a communication system in accordance with various exemplary embodiments of the disclosure.

Turning now to the figures, FIG. 1 illustrates an electronic communication system (or simply system) 100 in accordance with various examples of the disclosure. Electronic communication system 100 includes a database 102 comprising user identification information and habit information corresponding to the user information, a meeting controller 104, a monitoring module 106 to monitor scheduling information for a communication, and a comparison module 108 to compare scheduling information and habit information to determine whether a match exists between the scheduling information and the habit information to determine a habit. System 100 can also include a post-meeting information database, one or more devices 112-1116, a network 118, and/or a habit determination engine 122. Further, as illustrated in FIG. 1, two or more components, such as meeting controller 104 and monitoring module 106, can be part of a communication server 120.

Database 102 can include any suitable database, such as Microsoft SQL Server, MySQL, Microsoft Access, Oracle, etc. Database 102 includes user identification information and habit information corresponding to the user information. The user identification information can include any information for uniquely identifying a user in system 100. User identification information can include, for example: username, name, phone numbers, extensions and the like.

Habit information can include habits corresponding to preferences for each user, based on one or more parameters. The one or more parameters, described in more detail below, can be used to determine a habit if, for example, a habit is not known or changes. Exemplary habits include how users like to join communications and communication settings or features used during the communication. Parameter information can include, for example, types of communications (e.g., internal communications with coworkers, or external communications (e.g., with clients or customers), communications with superiors, or communications with subordinates). Further, habit information can correspond to user devices, such that particular user habits are associated with one or more user devices or types (e.g., mobile or not) of user devices. Additionally or alternatively, habit information can correspond to a type of user (e.g., presenter, participant, organizer, or the like), which can change during a communication—e.g., a user may be a presenter during a portion of a communication and a participant (i.e., non-presenter) during another portion of the communication. Additionally or alternatively, habit information can include habits and/or other information associated with a user's location—e.g., different habits for a user while in the office versus away from the office, whether at home or not, and the like; time, date, or the like.

Specific exemplary habit information can include, for example, a device a user uses to join a communication, settings for one or more devices that a user uses to join a communication, habits for a user when the user is a participant, habits for a user when the user is a presenter, and the like. Habits for joining a meeting can include a user device, an application on a device to use, whether to automatically dial in to a conference or whether to have a conference server call a participant device, whether a conference server should send a text or email to join the conference, and the like. Habit information can also include habit information for once a communication has started. Such in-meeting habit information can include, for example, video on or off, microphone on or off, a preferred background for video communications, camera settings, speaker volume setting, microphone (e.g., volume) settings, tile layout, and the like.

Habit information can include parameters, such as user location, time, date, duration of a communication, a communication originator, a presenter, and the like. As discussed in more detail below, the habit that is used for a communication or a portion thereof can depend on one or more of such parameters.

Meeting controller 104 can include any suitable module for connecting one or more devices (e.g., devices 112-116) to a communication. By way of example, meeting controller 104 can be a standalone module or a module that is part of communication server 120. In accordance with examples of the disclosure, meeting controller 104 is configured to: if a habit for joining a communication exists in the scheduling information, automatically perform one or more of: automatically sending a push notification to join the communication to a user device and automatically joining the user device to the communication, and if a habit for joining the communication does not exist, determining a method used by the user device to connect to the communication and automatically updating the habit information with a habit corresponding to the method used by the user device to connect to the communication. A method used by the user device to join the communication can include, for example, one or more of joining via an application on the user device, requesting a call to the user device to join the communication, requesting a link to join the communication, receiving a pushed call to the user device to join the communication, and receiving a pushed link to join the communication. Meeting controller 104 can also be configured to determine a type of device of the user device (e.g., mobile, desktop, or the like) and to include the device type in the habit information.

As used herein, "module" can refer to computer program instructions encoded on computer storage medium for execution by, or to control the operation of, data processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., solid-state memory that forms part of a device, disks, or other storage devices). By way of examples, meeting controller 104 can include a conference and/or collaboration system available from Mitel.

Monitoring module 106 is configured to monitor scheduling information for a communication. By way of examples, monitoring module 106 can review calendar information for one or more users (e.g., at a set time interval before a communication is to start) to determine whether any habits have been specified. The scheduling information can include, for example, a reminder that a meeting is about to start.

Comparison module 108 uses a processor to compare scheduling information and habit information in database 102 to determine whether a match for a habit exists between the scheduling information and the habit information. For example, comparison module 108 can determine whether a habit exists for habit information transmitted to communication server 120.

Communication server 120 can be or include any suitable server. Communication server 120 can perform various functions as described herein. For example, communication server 120 can provide electronic communication (e.g., audio, video, text, and/or email) links between one or more devices 112-116. In accordance with an example of the disclosure, communication server 120 includes a private branch exchange (PBX) server.

Habit determination engine 122 can be a module to determine a user habit for joining and/or use during a particular communication. For example, habit determination engine 122 can determine how a user joined a particular communication and then have that information stored in database 102. Additionally or alternatively, habit determination engine 122 can monitor a communication and determine one or more in-meeting user habits during the communications.

Post meeting database 110 can be a separate or part of the same database as database 102. Database 110 can be or include any suitable database, such as a database described above in connection with database 102. Database 110 can include user information, meeting information, and meeting feedback information, such as meeting feedback received from participants, meeting statistics, action items, and the like. Such post-meeting information can be used to improve (e.g., automatically improve) system 100 and/or (e.g., automatically) provide feedback to participants or others. In some cases, information in database 110 can be accessed by participants or others. In some cases, the post-meeting information is automatically pushed to participants and/or designated others.

Devices 112-116 can be or include any suitable device with wired or wireless communication features that can connect to network 118. For example, devices 112-116 can include a wearable device, a tablet computer, a wired phone, a mobile phone, a personal (e.g., laptop or desktop) computer, a streaming device, such as a game console or other media streaming device, or the like. One or more of devices 112-116 can include an application or client to perform various functions set forth herein and/or to cause to be displayed, text and/or other information as described herein.

Network 118 can include or be, for example, an internet protocol (IP) network. Exemplary types of networks suitable for communication with network 118 can be or include a local area network, a wide-area network, a metropolitan area network, wireless networks, a private branch exchange (PBX), or a portion of the Internet. Various components of network 118 can be coupled to one or more other components using an Ethernet connection, other wired connections, and/or wireless interfaces. Network 118 can be coupled to other networks and/or to other devices typically coupled to networks. By way of particular example, network 118 includes a communication network and network 118 can be coupled to additional networks, such as a public switched telephone network (PSTN) or the like, that can be coupled to one or more devices, such as devices 112-116.

Exemplary methods in accordance with examples of the disclosure include determining habit information, storing the habit information in a database, monitoring scheduling information of a user, determining whether a match of habit information exists between habit information in a database and habit information in the scheduling information, and if a match exists, automatically performing one or more of sending a push notification to the user using a habit and automatically joining a user to the communication, and if a match does not exist, determining a method used by the user device to connect to the communication and automatically updating the habit information with the habit corresponding to the method used. Exemplary methods can further include: after the communication is established, determining, monitoring, storing one, and/or automatically applying one or more in-meeting habits.

In accordance with further examples of the disclosure, a communication method includes joining a communication using a user device, determining whether a habit for joining the communication for the user device exists, and if a habit for joining a communication exists, automatically joining the meeting using the habit, and if a habit for joining the communication does not exist, determining a method used by the user device to connect to the communication and automatically updating the habit information with a habit corresponding to the method used. As illustrated below, exemplary methods can also include determining meeting feedback and automatically sending the meeting feedback to one or more participants (and/or others) and/or monitoring in-meeting habits during the communication and automatically manipulating one or more communication parameters based on an in-meeting habit of the one or more in-meeting habits.

Figure 2:
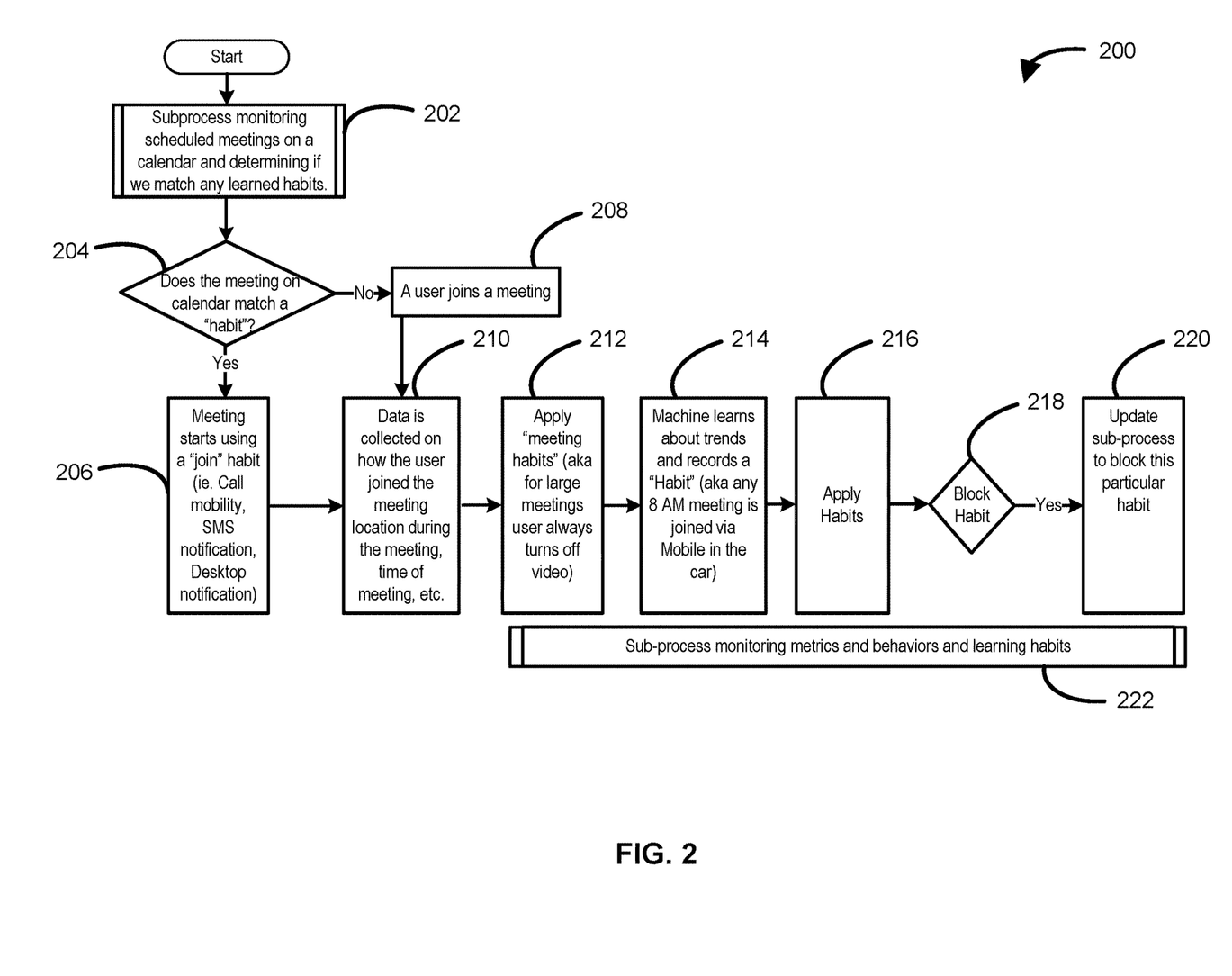
FIG. 2 illustrates a flow diagram and method in accordance with exemplary embodiments of the disclosure.

FIG. 2 illustrate a communication method 200 in accordance with examples of the disclosure. Method 200 includes the steps of monitoring scheduled meetings to determine habits or habit information (step 202), determining whether the habit information includes a habit (step 204), if a habit exists for joining a meeting, then automatically joining the meeting using the habit (step 206), and if a habit for joining the meeting does not exist, manually joining the meeting (step 208). Whether the meeting is automatically joined using a habit or manually joined, habit information, including, for example, device type, location, time, date, and the like is stored in a database, such as database 102, during step 210.

Once a user joins a meeting, in-meeting habits for the user can be applied (step 212). During step 214, machine learning is used to determine habits (e.g., communication connection type, video on or off, microphone on or off, a preferred background for video communications, camera settings, volume setting, and tile layout, and the like). The habits can be applied during step 216 and/or stored for (e.g., automatic) use during a subsequent communication with matching habit information. The habits can be automatically applied during step 216 or options can be presented to a user to select from a group of habits.

During step 218, a user can override or block a habit from being implemented. For example, a habit may include muting a device. In this case, a user can unmute during step 218. When a habit is overwritten or blocked, the habit and corresponding habit information can be stored in a database (e.g., database 102).

Step 122 includes running a subprocess, which can continue to run during a communication. Subprocess step 122 can include continuing to monitor metrics and behaviors (e.g., parameters/habit information) of a user during a communication and learning habits of the user that are associated with the parameters and storing the parameters and habits in a database.

Figure 3:
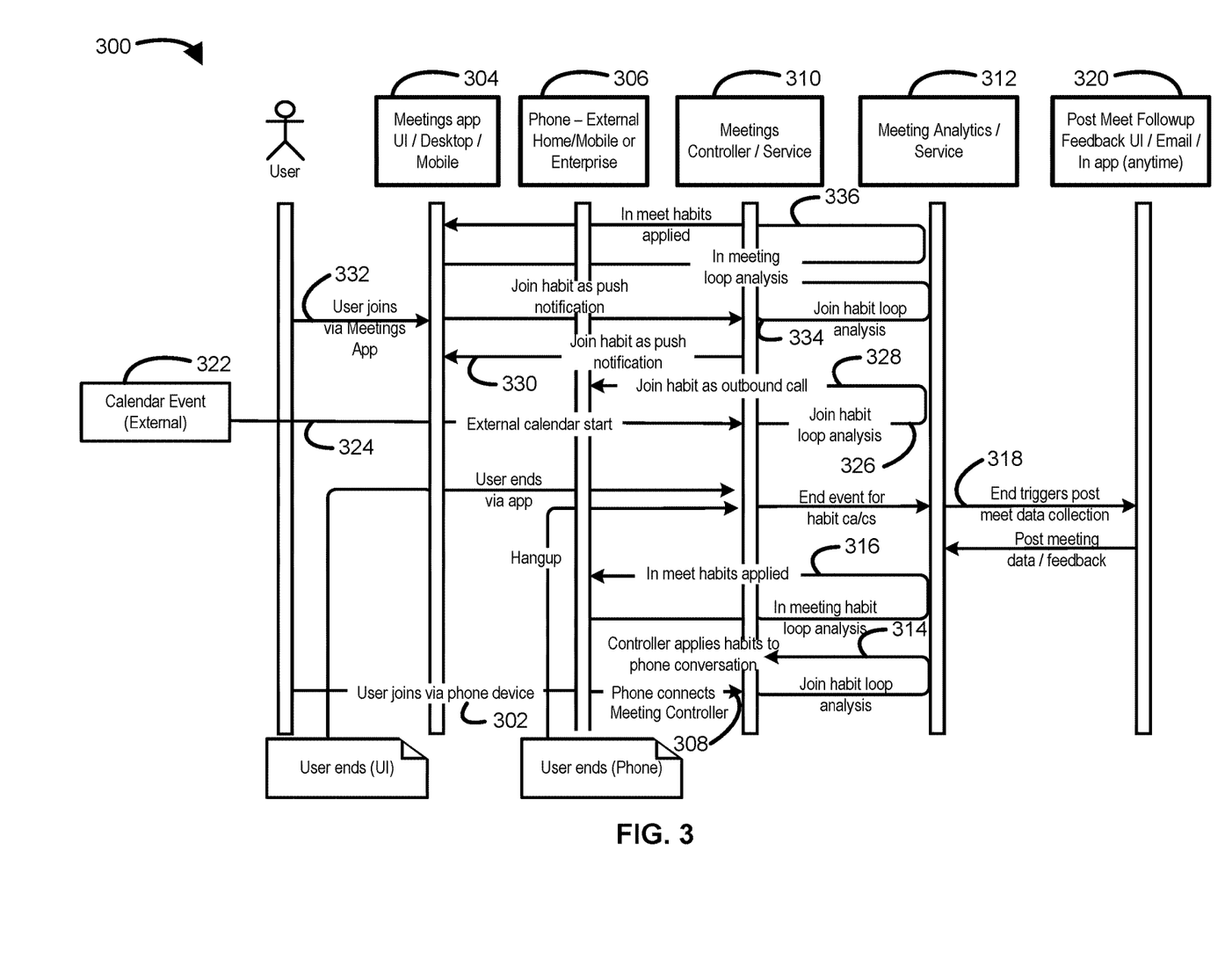
FIG. 3 illustrates a flow diagram and method in accordance with additional exemplary embodiments of the disclosure.

FIG. 3 illustrates a flow diagram of a method 300 in accordance with additional exemplary embodiments of the disclosure. Method 300 can be the same or similar to method 200.

Steps 302, 308, 314, 316, and 318 can be used to join a meeting and determine and apply habits from a device that calls in to a communication. At step 302, a user joins a conference using, for example, a user interface or application 306 on a device, such as a mobile device. During step 302, a user device is connected to a communication server, such as communication server 120 described above.

During step 308, a user device is coupled to a meeting controller 310, such as meeting controller 104 (which can form part of server 306). Once the device is connected to meeting controller 310, a meeting analytics module can continue to run (step 314) and to collect information, such as habit information and/or parameters, and one or more habits can be applied to the communication using meeting controller 310 during step 316. At the end of a communication, communication (or meeting) data can be collected and stored (e.g., in database 110). The post-meeting information 320 can be presented to the user—e.g., using post-meeting user interface, email, or within an application on a user device.

Steps 324, 328, 332, 334, and 336 illustrate a user joining a communication associated with a scheduling event, such as a calendaring event. In this case, a calendaring event 322 is sent to meeting controller 310 (step 324)—e.g., using an application or user interface 304 on the user device. During step 326, meeting analytics service 312 and/or monitoring module 106 can review calendar event 322 for a habit to join the communication. If the habit exists in the calendar event or can be determined (e.g., using determination engine 122, comparison module 108, and database 108), then the habit can be automatically applied to cause the user device to connect to the communication—e.g., step 328 as joining using an outbound call to the user device or step 330 as communication server pushes a notification to the user device. Once the user joins the meeting (step 332), meetings analytics module or service 312 can continue to run (step 334) and to collect in-meeting habit information, and one or more habits can be (e.g., automatically) applied to the communication using meeting controller 310 during step 336.

Systems and methods can optionally include one or more additional features presented below.

A. Optimizing Meeting Participation by Adding Measurable Outcomes

The methods of the current embodiment provide for optimizing meeting participation by adding measurable outcomes. This can be achieved, for example, by establishing goals, yet requiring participation in achieving those goals measurably is not supported in existing embodiments. For example, adding attachments is a fairly static approach to share information (in a meeting invitation) with minimal impact or strategic purpose. By associating measurable outcomes (such as goals) and allowing participants to suggest a new goal that is partially (or completely) fulfilled is much more collaborative and novel, as compared to a traditional meeting invitation (that uses static text to infer an outcome).

The benefits of this embodiment include, but are not limited to, attendees join meetings with punctuality and with an awareness of the goals of the meeting. All of the meeting data, such as agenda, goals, documents, and notes, are all together in one locale and provide an audit trail of the dialogue within.

Method steps of this embodiment include:
(1) Sending a meeting invitation.
(2) Adding in measurable outcomes such as goals.
(3) Tying in an agenda that is less uncoordinated and more autonomous.
(4) Adding documents that are associated with stakeholder representation and key dependencies.

B. Adapting Social Media Spaces for Meeting Invitations

The methods of the current embodiment provide for embedding forum-like discussions in what would otherwise be static invitations. Meetings typically contain a pane or section for additional information like agenda topics and conference coordinates.

Method steps of this embodiment include:
(1) User inputs content into a field, such as updating an agenda.
(2) Other users can see the same updates; however, the updates to the invitation need to be submitted (i.e., sent) before other users can see the updates.
(3) A real-time forum-based discussion is added to the meeting construct.

The benefits include, but are not limited to (i) similar to having an inbox within an email or, in this case, a calendar invitation, and (ii) all participants are able to converse within the meeting invitation, thereby ensuring all of the meeting data, such as agenda, goals, documents, and notes, are together in one place and provide an audit trail of the dialogue within.
(4) Users are able to socialize within the forum chat and spawn further threaded discussions embedded within calendar invitation.
(5) Participants can vote on the content within the forum-chat including adding images, text and emojis.
(6) It is also possible to convert participant's contributions (agenda items and notes) into actionable items (i.e., Task 1, Task 2, etc.)

C. Feedback Mechanism to Improve Conference Media Stream Quality

Methods of the current embodiment provide recommendations to users to optimize video and audio. While older systems typically poll the user, e.g., "how was the quality?;" systems do not recommend to users real-time any actions to be taken ASAP to improve the quality "on the fly."

Method steps of this embodiment include:
(1) A user is engaged in a media-based communications session, such as a video call or a voice call.

(2) System detects a factor or series of factors affecting the media quality, which can result in an action to bypass the problem.

(3) System proactively suggests a highly likely contributing factor affecting media stream quality to equip the user with key knowledge to troubleshoot an issue.

For example, if user Tristan is rustling papers, the interface, in accordance with an embodiment, may prompt the user and state "you're being kind of loud at your conference location," . . . etc. Another example may be if a YouTube™ or Netflix™, or similar type session is running, the exemplary system may recommend, "Tristan, a web session running in the background is affecting the conference video quality. Consider turning it off." And another, when echo is detected, the exemplary system recognizes that Sonny has not yet turned off his microphone.

D. Professional Spaces Within a Meeting Environment for Purposes of Collaboration Methods of the current embodiment provide a means for all meeting stakeholders to serve up content that is associated with their profile (such as their work-related files) and that such content would be pertinent to the meeting's goals/stakeholders. The user then always has content or related other goals OR part to contribute to the bigger picture (project related) being published within the meeting apparatus.

Today, this might include a web link to an external networked or cloud-based storage site; however, the proposal is to embed the critical meeting resources for a participant with their tasks, goals, and/or meeting-related requirements. Often, users see an interface link or button for more information; however, in a meeting-oriented apparatus, such as an event scheduling or calendar application, this is absent.

Method steps of this embodiment include:
(1) Users within a workgroup have tasks that are being managed within a larger objective-oriented framework (i.e., tracked tasks and measurable outcomes).
(2) A meeting is called by a key stakeholder and invites one more member of the workgroup.
(3) Specific goals or tasks are included in the meeting invitation and this includes actionable items such as expectations to complete a task with a measurable outcome ("Deliver draft specification for team review by DATE.")
(4) The user identified within the requirements for the meeting may set their presence indication to "ALL" or "Some" of the tasks have been completed.
(5) Meeting participants can then click on a user's profile to see the relevant files that are "pushed" by a user for the meeting at hand.

For example, the current embodiment may include the following:
Background (old): During the meeting, "I'll send you that file."
Invention (new): "Sonny, help yourself—the specification we all need to review is under my profile."

E. Interacting with Transcribed Content to Improve Productivity

Methods of the current embodiment provide for live transcription to generate content over which participants can collaborate to improve productivity. Live transcribing of meeting proceedings or communication sessions leads to a raw-data view, which, once analyzed, can be processed through NLP techniques to produce meeting highlights. These highlights can then be tagged to create autonomously derived decision-points, then even assigned to the key participants who were speaking during the segment of relevance in the meeting (or outside of the meeting). Furthermore, load-balancing based on the tagging action may help to avoid over-tasking an individual already identified as a participant with a workload that has been identified within a meeting apparatus.

Method steps of this embodiment include:
(1) Meeting or communication session (recording a live meeting or speaking during a phone call) between participants is underway.
(2) A transcription is created as a real-time event OR resulting from post-processing.
(3) The transcription is analyzed using natural language processing techniques to parse the segments into discrete word phrases, where the determination of keywords results from a comparison to a corpus, then filters are applied to determine the keywords that form the basis of topics and actionable phrases ("take the action"+{verb phrase}+{noun phrase}, etc.) as an exemplification of a process.
(4) The meeting or communication system can then create task-flows and/or summary-reports of the artifacts resulting from the discussion to track outcomes OR simply inform the participants over what was said in terms of highlights.

Advantageous aspects of the current embodiment may include, but are not limited to:
convert content into actionable items. This can be done by the stakeholders OR automatically using NLP and machine learning;
automates the note-taking process, where verbatim accounts are less helpful;
empowers meeting participants to be more productive and listen with fewer distractions;
distills rambling discussions into key points, pending decisions, actions, etc.; and
provides useful metrics regarding proportion of meeting spent on topics, or off-topic.

F. Meeting Content and Facilitator Scoring to Enhance Collaboration and Intellectual Property Protection Methods of the current embodiment provide a means for meeting participants to rate the effectiveness of a meeting or score the degree of association with meeting content. This method is helpful to properly assign the originator of an idea (based on learned content) expressed in a meeting. For example, it could be helpful to accurately name inventors in R&D gatherings or such environments where attribution is crucial (i.e., sales, etc.).

Method steps of this embodiment include:
(1) When a meeting is completed, participants are offered a user-interface to rate the effectiveness of the presenter(s) and the overall score of the meeting.
(2) Participants can also be tagged with ownership or degree of contribution for ideas that were expressed during the discussion.
(3) The system either auto-generates the ideas that were expressed or offers participants to mention the key topics or ideas that were raised and who conceived them.

G. Highlight Reel Meeting Output to Improve Collaborator Efficiency

Methods of the current embodiment provide a "reel" during the meeting that is available to encapsulate the different media events including video content (slides displayed, etc.), audio overview, public chat instances, and the order in which each stakeholder participates (e.g., "Sonny's Moments: 2:28, 4:34; 8:45").

Method steps of this embodiment include:
(1) When a communication session is underway, all the events that were underway, including video, audio, chat, and presence indicators for each participant, are recorded.
(2) The audio recording is transcribed, and video facial recognition technology may be applied as well to isolate the identity of the participants.
(3) Events are then added to the resulting output to create highlights, such as the time each participant spoke, links to specific moments (i.e., when user x joined or exited, beginning of presentation), an interactive timeline (topics introduced), and even a quick catch-up option that accelerates the reel to avoid wasting everyone's time recapping the missed portions.

Advantageous aspects of the current embodiment may include, but are not limited to:
Links allow users to jump to specific moments in the reel and allow late (or distracted) participants to catch up quickly.
The reels are also standard output to elevate meeting output to include all the events and not just record the audio or video.
Moderators or participants can manually tag reels to allow follow up at specific moments during the collaboration.

H. Participant Reaction Based Voting for Meetings

Methods of the current embodiment equip meetings with voting options just like agenda items; furthermore, goals/tasks are scored using a similar technique. The exemplary system may measure outcomes using emoji-based lexicon and, for example, move off an agenda item depending upon what input is provided by participants to determine outcomes (such as move forward, stall to discuss further, etc.). Specific emojis could create a more collaborative technique to determine a user's sentiment regarding a meeting response: Fewer words are required, unhappy emoji is more palatable than "I don't like the idea," "as much as I believe the strategy to . . . it adds more risk, we need to be more conscious of time to market, I vote to proceed" as opposed to a 'meh' or slightly enthusiastic emoji.

Today, emoji-based interaction is prevalent, as well as requests, such as to "Like" or "Dislike" content; however, it is used rather informally and not used in measuring outcomes of workplace gatherings. The current embodiment provides the full spectrum of emotional indicators from a systematic morphology to apply decision-making and evaluation within a meeting apparatus.

Method steps of this embodiment include:
(1) A meeting-based lexicon is submitted by the organizer of a meeting. It may be a more restrictive set of emojis or a more flexible set of emojis like in a brainstorming session (no wrong answers).
(2) During a meeting OR at the end of a meeting, the facilitator may invite participants to use small digital images or icons from the lexicon to express an idea or emotion regarding the subject matter in the meeting.
(3) The participants react to specific discussion points that the facilitator served through the meeting apparatus.
(4) The facilitator receives the results and can interact further with the participants to understand why they reacted in the way they did (for example, "Zoe, you expressed confusion over the proposal. Can you elaborate?").
(5) The results are archived and may be matched with user's input to create an irrefutable record regarding voting tendencies for later reference.

Advantageous aspects of the current embodiment may include, but are not limited to:
Throughout the conversation, participants add reactions to show support and excitement about the discussion."
Participants also have the option to thumbs up different sections to show that they agree with the topic being discussed.

I. Methods of Gamification for Unified Collaboration and Project Management

The methods of the current embodiment provide the outcomes of workplace situations, such as decision-points, assigning responsibility, and solving problems to be determined based on the gamification of content derived from a discussion. The discussion may be an online discussion or as part of a meeting facilitator function monitoring a live discussion (i.e., user with mobile app at a café with stakeholder(s) at a table).

Method steps of this embodiment include:
(1) Content is generated from a discussion. The content may be derived from an online meeting (transcription; keyword detection; topic detection; etc.). Content may also be based on a live discussion that is recorded for post-processing (i.e., recording; transcription; keyword detection; topic detection; etc.).
(2) During the meeting, the gamification function is applied depending on user preferences and presents the participants with quizzes or challenge-phrases to verify the stakeholders are aware of what was just presented, etc. In another embodiment, an alternate game (other than just a word game or quiz) may be played to achieve a result designed by the facilitator (facilitator pre-configuration and entry into a game template-construct leads to a desired result that is to be achieved by the participants until the next phase of the meeting can continue).
(3) In another embodiment, the system may display a set of findings that become the basis of a game requiring interaction by the participants. Rules may be applied preventing the participants from moving to the next agenda item until a team or individual goal is achieved. A game structure is created to allow it to be populated with content derived from the meeting.
(4) In another embodiment, the facilitator can offer participants games to decide who is assigned actions. This goal-oriented approach is intended to invite interaction and learn about work-oriented subject matter.

Advantageous aspects of the current embodiment may include, but are not limited to:
Unassigned meeting actions and tasks are determined based on the outcome of quick games between participants.
Actions that are not completed on time result in gaming concepts being applied, such as "You're in the penalty box."
Quick games may also resolve unassigned tasks and goals, e.g., TBC, Tic Tac Toe, Hangman.
The idea using gaming strategy to solve problems is also interesting because it can result in the participants engaging in such concepts as "before we can end this discussion, we need to open the Chest of Jewels OR open the secret portal. How do we do that?" Answer: Come up with 5 tasks that will help us achieve the project deadline."

J. Ultrasonic Beaconing

Methods of the current embodiment include using ultrasonic messaging in a communication system to enable each device logged into a meeting (audio or audio+video) to broadcast a unique device identifier. Every device that has a microphone capturing audio could then listen for ultrasonic messages that indicate another device that is on the call within audible proximity. This device proximity data would be transmitted to the CloudLink™ Meeting Platform, allowing a provider to orchestrate the user experience of collaboration devices that are co-located.

Method steps of this embodiment include:
(1) All audio lines broadcast an ID every X number of seconds @ 19 kz—or near ultrasonic sound.
(2) The cloud application, or equivalent, of the present embodiment has an awareness at all times of devices that are within audio range of each other.
(3) When there is more than one device present, the cloud application is aware of which user it belongs to.
(4) The Cloud Link Meeting Platform is then aware of the roles of each device in the meeting.

K. Automatically Discovering Collaboration-Enhancing Devices, Such as Displays, Cameras, Speakers, and Microphones Methods of the current embodiment provide the ability to discover and utilize collaboration hardware to add to the value of meeting experiences when at least one participant is in a conference room. This analysis can determine the ability to discover devices that are most likely to exist inside of a "Huddle Room," which is defined as a small conference room with common off-the-shelf displays, cameras, speakers, and phones. The system of the current embodiment includes the programmatic (auto) discovery of devices using either a Mac/Windows computer or iOS/Android device.

Method steps of this embodiment include:
(1) System detects all possible devices, even those considered not compatible.
(2) System connects through an open media connection that permits communication (i.e., SMS, email, WiFi attempt (Bonjour, iMessage, etc.), social media, etc.
(3) User is offered a collaboration link, such as a meeting invitation.
(4) Alternatively, system maintains a list of trusted connections, apps, and users to determine a path of connectivity to offer the user a link or other means to connect to the meeting.

L. Autonomous Meeting Facilitator

Methods of the current embodiment provide an autonomous meeting composer, i.e., a system-directed capability that calls meetings with the stakeholders based on an intake of digital information which may be based on keywords extracted from conversations (transcribed from interactions between users), or requirements stated in emails, chat, etc.

Method steps of this embodiment include:
(1) Content source is analyzed for meeting topics, such as risks, actions, planning, goals, etc.
   NLP techniques can be leveraged to isolate words that form the basis of an agenda and the identified participants.
(2) The system then calls a regular meeting (i.e., just a booking; possibly with keywords used to call an agenda and/or meeting purpose/title) OR an enhanced meeting using detected goals, crucial milestones, etc. to work towards key objectives that were identified OR allow participants to set their deadlines. Participants may also create additional goals or tasks or modify system generated ones.

Advantageous aspects of the current embodiment may include, but are not limited to:
Actionable items are generated based on transcribed content.

Participant's availability is used to book completion of previously identified goals, plus adding new ones in a meeting.
Stakeholders don't initiate closer of a goal or task; the system autonomously books key engagements with identified stakeholders with measurable outcomes.

M. Advising Meeting Participants of Their Contributions Based on a Graphical Representation ("Heat Map")

Methods of the current embodiment provide a collaboration system configured to measure the contributions of its participants and present the contributions using graphical representations ("heat maps"; classic metering, scoring, etc.)

Method steps of this embodiment include:
(1) Participants in a collaborations session (i.e., meeting)—not necessarily an online discussion, since tracking participants in a live discussion is possible using smartphones—using, for example, speech recognition techniques, such as speech format characteristic detection OR device detection OR caller-identification, etc.
(2) Metrics are gathered and maintained for each speaker, for example, frequency of words spoken, speaker duration, primary engagers (i.e., when you speak, this person interacts with you the most).
(3) The system prompts each participant AND/OR the facilitator/leader on the level of participation. User may be prompted by them by system to engage more. Facilitator may prompt a participant to engage more. System may prompt a participant to engage less when a particular speaker talks. System advises all participants on their level of effort in the collaboration session (shows how much they are speaking; graphical display; colored alerts). System throttles down the discussion based on speaker traffic (i.e., system-initiated breaks, breathing exercises, video game, automatically raising a hand for a less engaging speaker, etc.)

Advantageous aspects of the current embodiment may include, but are not limited to:
System helps a participant more effectively engage the other participants in a meeting equally using a 'contribution heat map' function.
Visual cues are used in real-time to steer the conversation towards the meeting goals.

N. "Shoulder Tap," Aka Lightweight Intrusion Technique to Ask a Question During a Collaboration Session Methods of the current embodiment include a subtle meeting intrusion, thereby not interfering with an ongoing collaboration session. The methods can also be used to hold off an intrusion and deliver it later OR itemize it for closure at a later date, like a meeting action. Traditional applications merely offer a screen pop to inform the user of transient content.

Method steps of this embodiment include:
(1) During a collaboration session, when a co-participant has a query or suggested action for another participant, the system offers a new media session to be created (i.e., video call) to foster interaction, e.g., the system offers a video session OR audio message within a meeting already underway.
(2) System determines the level of engagement, such as the participant is reading a document or presentation, talking, hearing a response to a question that they asked, or temporarily away from their desk. If a user is distracted or busy (based on system detection), the "shoulder tap" is delayed until the user is available. If the user is busy, then they can leave a message (voice note; pending question to be answered; etc.). Evolution of call waiting for collaboration.

O. Smart Meeting Detection (Aka "Scouting") as a Service

Methods of the current embodiment include skillset matching for the purposes of including proper personnel in cross-functional and self-directed environments. The improvement to professional development by speeding up the decision-making, allowing hosts/facilitators to factor in the availability of the right experts for meetings and giving participants new ways to contribute their perspective leads to an optimal collaboration experience. Far too often, the right people are not available OR a meeting is booked, positing that by calling the meeting, it should preclude that the right people attend. However, the trend in the industry is towards teams that are cross-functional and self-directed, meaning that people with varied expertise and background may be called upon in the absence of a classic expert.

Method steps of this embodiment include:
(1) When a meeting is proposed, the system refers to a database for the skillset-related keyword matches, i.e., the meeting agenda, title, and skillset arrays based on previous meetings is leveraged.
(2) If a participant is not available, the system pushes similar skillsets highlighting expertise not previously known, based on user profiles created by users themselves and/or management (résumés, performance reviews, Social Media, etc.)

Advantageous aspects of the current embodiment may include, but are not limited to:
makes meeting participant recommendations for hosts to consider;
invites participants based on the selected topic and the individual's expertise;
advises when a participant is overloaded or over-tasked;
individuals can indicate their invite preferences, and non-critical teammates have the option to delegate the responsibility of attendance to a human colleague or to their artificial alter-ego;
alter-ego helps non-attendees create a video recording of their perspectives while voicing over key documents;
system introduces this alter-ego or surrogate representation at the right time in the meeting while they are not in attendance;
solves the problem of meeting-overload; and
employees can divulge their areas of expertise to equip the system with proper skills to delegate automatically.

P. Expression Engine

Methods of the current embodiment provide a means to express ideas during a collaboration session that spawns collaboration related interaction. For example, if users can sketch a diagram to communicate, then the system uses built-in webcams OR a smartphone camera to integrate the expression, then additional tools become available, such as supplementing the diagram with voiceovers, which can be attached to sketches as users record their drawing, which are auto-transcribed to add more nuance and explanation to the visual. This would be very useful in mechanical design environments or in architecture. However, it can also be used in project management and software design sub-disciplines. Furthermore, the system could also adapt an idea expressed and polish it up or enhance it for presentation mode.

Advantageous aspects of the current embodiment may include, but are not limited to:
The receiver can easily annotate further on this idea, transforming the sketch into an infinite digital whiteboard.

Workers can also seamlessly transition into live collaboration from the main expression canvas space or chat, which maintains the original chat context and live transcribes the meeting to feed back into the chat.
A participant can sketch an expression of their meeting-related idea, then using Google™ image recognition, optionally serve up related imagery to assist user in expressing their idea. This dynamic search setting can be disabled.

Q. Surrogate Meeting Representation

Methods of the current embodiment include a virtual surrogate that collects and provides input from attendees who cannot attend to ensure absentees voices are heard. The system learns using natural language processing and machine learning to process dialog and deliver responses that are based on a known corpus familiar to the primary stakeholder. Generally, the technique relies on a general corpus to understand what users are saying to interpret meeting-oriented dialog and a custom corpus to create a most relevant lexicon where the tacit knowledge resides to assist the user in building relevant responses based on their body of work and subject expertise.

Surrogate meeting representatives are different than avatars that are being used already by meeting and collaboration providers.

Method steps of this embodiment include:
(1) When a user is not available to attend a meeting, the user initiates a meeting surrogate.
(2) The meeting surrogate is then able to process the natural speech provided by the participants.
(3) If/when prompted for the key stakeholder who is unable to attend to elicit a response, the system generates a response based on the body of knowledge that is based on a time-relevant snapshot of data (emails, presentations, previous conversations, etc.). The system may even support turning off the auto-pilot temporarily (perhaps they are busy and listening in, therefore they can monitor and barge in on the surrogate to override responses and deliver a specialized one).

R. Icebreaker Generator

Methods of the current embodiment propose a system-level intermission or "icebreaker" to be generated whenever meetings get monotonous or if a facilitator can predict the point at which a break is required. Research shows that participants get comfort and enhanced productivity by collaborating and contributing content, ideas, etc. after an icebreaker. However, current systems do not include such events built into a collaboration facility or meeting scheduler.

Method steps of this embodiment include:
(1) Facilitator or leader books a meeting.
(2) The configuration interface allows the facilitator to predict when an icebreaker is required.
It may be when a number of users start getting fidgety (i.e., after start-time, when room ambient noise amplitude suggests an icebreaker).
System may only notify the facilitator.
(3) Alternatively, if the system is programmed to "break the ice" every 45 minutes, for example, the screen changes and a planned event is displayed (e.g., GIPHY, suggested clip from a library of clips, or a funny audio clip is played for audio-only participants).
(4) The system is aware of when breaks are required (timed or audio detection).
However, participants can also lobby for an icebreaker, which may consist of a "bio break" followed by, or concurrent with, the "icebreaker."

Advantageous aspects of the current embodiment may include, but not limited to:

System automatically cues participants with an automatic icebreaker that is generated following a few different triggers, such as, for example, meeting length, dispute detection, dialog-complexity detection (NLP=off-topic detection; complex language being used; remarkable spaces between responses, i.e., lethargy, etc.).

S. Meeting Kickstarter

Methods of the current embodiment include aggregating a meeting's content and creating a summarization to pre-empt the discussion and increase participant engagement.

Method steps of this embodiment include:
(1) When a meeting is being staged, the exchange of information between the stakeholders is monitored.
(2) System aggregates the relevant content between stakeholders OR shared in a common space.
Information is mined and analyzed for topics (NLP).
(3) System parses the keywords using adjustable methods to determine the degree of relevance. Keywords and topics are identified plus additional sentences before and after; percentage of supplied context is adjustable.
(4) Context and highlights are moved to a template.
(5) Summary is sent to the stakeholders before the meeting. Preemptively engages the audience (i.e., known recipients) and learned context is summarized in a template.

Advantageous aspects of the current embodiment may include, but are not limited to:
"If you don't attend, here is what you're missing . . . "
"As you can see, most of this upcoming meeting is a rehash of the earlier discussions. Plan to attend or not accordingly."

T. Dry Run Meeting Facilitator

Methods of the current embodiment include facilitation of meeting presenter's "dry run" of meeting content and obtaining feedback on their delivery.

Method steps of this embodiment include:
(1) A presenter of prepared meeting content (PowerPoint, Keynote, etc.) selects "simulation" mode.
(2) The simulation mode allows the user to present their content, while the system monitors:
system monitors the spoken content AND/OR the written words.
(3) System applies rules of conformance based on social settings (formal, informal, etc.). Detection of wordiness is executed, and changes are recommended through annotations or scoring on passages of text (findings in report).
(4) Presenter's delivery of content is evaluated as well. A "keynote evaluation" mode might provide voice coaching to optimize orator's skills. Rapid word detection, i.e., "please slow down"; amplitude detection, i.e., "please speak louder" . . . OR "more softly"; tonality detection, i.e., "You sound monotone: Please try to annunciate your spoken sentences more."
(5) Additional function allows test audience to annotate content while watching or listening to the presenter deliver content. As an annotation tool, this function allows users to directly interact with and apply updates to the content that is being driven by the presenter.

Advantageous aspects of the current embodiment may include, but are not limited to:
provides a more collaborative way to get review feedback by seeing presentation decks in action; more effective simulation of delivery;
audience is furnished with functions to evaluate speaker AND content;
test audience can also provide live feedback similar to broadcasted debates where audience upvotes or downvotes during the presenter's dry-run; especially helpful for seasoned veterans (i.e., CEOs, etc.);
system also provides automated coaching in private tutoring mode; and
system can also automatically generate a meeting script based on past sessions; system uses a past-recorded meeting database to aid inexperienced presenters; and system applies NLP techniques to suggest preamble, idiomatic expressions, etc., generate small-talk, etc.

U. The Non-Meeting Generator

Methods of the current embodiment provide participants a means to determine measurable outcomes before a meeting has occurred to, for example, determine if the goals have been met, and therefore the meeting is no longer required. When a meeting needs to be called, the participants often "blindly" attend, not knowing if the objectives have already been met. If, however, a non-meeting generator could facilitate the initial entry and tracking of goals or actionable items, then when a to-do list is properly checked off, a meeting does not have to be called anymore.

Since online "to-do" lists exist already, if a meeting facility or event scheduler was intelligent enough to leverage artifacts, such as minutes, video-conference footage, transcription services, etc., and able to formalize the words used (based on descriptions of problems derived from a sentential calculus), then it may be possible to create a statistical method to determine an outcome, such as solving the problem of whether or not to book a meeting, to update an existing meeting, or to cancel a meeting entirely.

V. Digression Detection and Avoidance ("Conversation Parking Lot")

Methods of the current embodiment include a meeting system or scheduling application configured to conduct analysis of disparate conversations that are not contributing to the measured outcomes OR agenda items during a collaboration session.

Natural language processing can be used to isolate side conversations by listening in using an ultra-sensitive microphone or remote satellite microphones. Furthermore, smartphones equipped with productivity software can monitor the audio levels during key discussions and alert the facilitator that a participant has been identified that may be distracted or is conducting a separate conversation.

If the system detects a participant is holding a separate conversation, etc., it may prompt them "Would you like to park this conversation on the topic of XXXX?" This encourages the participants to pick up the dialog later (perhaps book a reminder via another form of media OR invite someone for a post-meeting chat) as opposed to simply being alerted that the participants are creating noise and to end the side chat which may be crucial despite the fact the topic was off-topic.

Method steps of this embodiment include:
(1) Conversation during a meeting is underway between participants.
(2) System monitors all the devices that are registered with the conferencing or meeting software.
(3) System alerts facilitator that distractions are detected.
(4) System may offer a follow-up discussion be created that is derived from the keywords included in the distraction.
(5) Alternatively, the user is notified that they are distracted OR that the meeting participants are distracted.

W. Virtual Meeting Attendee

A method of the current embodiment includes techniques that, if a participant is unable to attend a meeting, they can opt to send in the meeting filler.

Method steps of this embodiment include:
(1) Meeting invites a user to attend.
(2) User cannot attend the meeting so assigns a virtual attendee or delegate.
(3) Virtual meeting attendee listens for certain keywords identified by the user ahead of time.
   User enters a list of keywords they want to either be notified about OR to trigger a response from the virtual meeting attendee.
   User enters keywords they would like extracted from the meeting.
   Standard transcription would detect every word spoken, including content that is simultaneously being presented.
   User can adjust the amount of context desired and system may supply relevant content for later consideration.
   The system can also supply system responses in the form of a synthetic voice-assistant based on a scripted response provided by the user OR in the form of a text-based response. During a meeting, the system may time a response based on a command from the meeting participants OR be prompted to virtually present when a command is issued by the meeting platform.

X. Tinder for Work

A method of the current embodiment includes a "matchmaking at work" system based on professional attributes as opposed to personal. Professional workforces demand their workers be strong in certain skills depending on the role. Matchmaking that allows a worker to highlight certain skills they would like to develop in addition to certain key interpersonal strengths to ensure compatibility encourages more effective knowledge transfer and mentoring. Management can even encourage relationships between workers based on compatible attributes and requirements.

Method steps of this embodiment include:
(1) System recommends certain skillset be targeted based on management need or in the event a worker leaves the organization.
   a database or record of the skillset requirement is created (i.e., employee changes, hiring requisitions, etc.).
   many workplace management utilities manage and centralize this type of data (e.g., Concur).
   skillsets and experience may be mined from existing HR databases, too, including résumé-based searches, social media, etc.
   employee mentorship programs also identify personal goals and opportunities (e.g., if SW Development wants to move to Product Management; has business diploma from XYZ College)
(2) The requirement is fulfilled using a meeting application or calendar booking utility. System automatically detects requirements based on attendees present vs. those who cannot attend.
   when an employee is not available OR if the required skillsets identified within the meeting application are not available, the system pushes new skillsets based on their availability.

Y. Auto Status Visualizer

A method of the current embodiment "scrapes" the activities and situational data of workers and then auto populates their customized avatar with current status and availability. The methods drive status updates based on IOT sensors, smartphone location services, fitness gear biometric readings, media preferences (e.g., "Parker is listening to Rush on his laptop and is working on two presentations at the home office.").

Ultra-dynamic status indication is based on the idea that people's status is directly tied to their personal device status (smartphone, vehicle, watch, fitness/health tracker, computer, IOT endpoints, etc.). For example, remote workers need extra context about what activities are happening in the office. It helps people at work and especially remote workers maintain balance, focus and avoid interrupting situations where they would otherwise be able to see someone's obvious status while in the office.

Standard presence is replaced with hyper presence OR ultra-dynamic status, such as "Downloading a file," "Avoiding distractions," "Dealing with a crisis," "Walking to the . . . ," "Buying snacks or drinks at the vending machine," "talking to Mark at the photocopier," "Mark is eating lunch at Jojo's desk," "Watching a Tonight Show clip on his iPhone in the courtyard," etc. While remote workers benefit by a more detailed status other than the generic status updates, this idea ensures people are more in tune with their work environments and how they interact with them. The system relies on device presence and user presence; IOT drives more dynamic updates; "Jojo is freezing his hands off at the bus shelter."

The systems and methods disclosed herein collectively address the needs of meeting users by getting more utility out of the information that is supplied to collaboration and event scheduling applications. Furthermore, the methods and ideas disclosed allow users to increase their productivity based on the detection of such information and by applying techniques not traditionally used in meeting applications to create a more results-oriented experience that is more engaging and to make meetings more effective.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may be standalone or combined in any combination. It will be recognized that changes and modifications may be made to the exemplary embodiments without departing from the scope of the present invention. These and other changes or modifications are intended to be included within the scope of the present invention, as expressed in the following claims.

The invention claimed is:

1. A communication system comprising:
   a database comprising user identification information and habit information, wherein the habit information corresponds to the user identification information;
   a meeting controller;
   a monitoring module to monitor scheduling information for a communication;
   a comparison module configured to compare scheduling information and habit information to determine whether a match exists between the scheduling information and the habit information;
   a habit determination engine configured to determine one or more habits of a user associated with the communication, one or more habits of the user for joining the communication, and one or more habits of the user related specifically to other meeting participants; and a meeting analytics module that collects one or more of the user's in-meeting habits during the communication, wherein the one or more in-meeting habits comprise one or more in-meeting changes of the user setting associated with the user's identification information and are related to at least a portion of the parameter information;

wherein the habit information comprises (a) the one or more habits of the user for joining a communication, (b) the one or more in-meeting habits, (c) one or more habits related to a user's preference for sharing information or content during the communication, and (d) whether the user is a presenter, a participant, or an organizer;

wherein the database further comprises parameter information comprising whether the meeting communications are (a) internal with workers of the user, (b) external with clients or customers of the user, (c) with superiors of the user, or (d) with subordinates of the user, and wherein the user device settings change during the meeting depending on one or more of parameters (a)-(d);

wherein the meeting controller applies one or more of the in-meeting habits during the communication;

wherein if a habit of the user for joining a communication exists in the scheduling information, the meeting controller performs one or more of automatically sending a push notification to join the communication to a user device of the user and automatically joining the user device to the communication;

wherein if a habit for joining the communication does not exist in the scheduling information, the meeting controller is configured to determine a method used by the user device to connect to the communication and automatically update the habit information with a habit corresponding to the method used by the user device to connect to the communication and;

wherein the user device settings change during the meeting depending on whether the user is the presenter, the participant, or the organizer.

2. The communication system of claim 1, wherein the method used by the user device to join the communication is selected from the group consisting of joining via an application on the user device, requesting a call to the user device to join the communication, requesting a link to join the communication, receiving a pushed call to the user device to join the communication, and receiving a pushed link to join the communication.

3. The communication system of claim 1, wherein the habit information comprises one or more of duration of the communication and communication originator.

4. The communication system of claim 1, wherein the habit information comprises one or more of video being on or off, microphone being on or off, a preferred background for video communications, camera settings, volume setting, and tile layout.

5. The communication system of claim 1, wherein the habit information comprises habits associated with one or more devices.

6. The communication system of claim 1, wherein the habit information comprises habits associated with a user's location.

7. The communication system of claim 1, further comprising a post-meeting database comprising meeting feedback information, wherein the meeting feedback information is used to automatically improve the communication system.

8. The communication system of claim 1, wherein a communication server comprises the monitoring module.

9. The communication system of claim 1, wherein the push notification includes an invitation to join a meeting and a meeting agenda that is sent to meeting participants, and the meeting controller is further configured to permit the meeting participants to (a) update the meeting agenda, and (b) communicate with each other via the meeting invitation.

10. The communication system of claim 1, wherein the meeting controller further includes an interface configured to (a) identify during the meeting a video or audio factor that could disrupt the quality of the meeting, and (b) send a message to the user device of a user responsible for the video or audio factor.

11. A communication method comprising the steps of:
determining habit information of the user, wherein the habit information comprises (a) one or more habits of the user for joining a communication, (b) one or more in-meeting habits, and (c) one or more habits related to a user's preference for sharing information or content during the communication;
storing the habit information in a database;
monitoring scheduling information of a user;
determining whether a match of habit information exists between habit information in a database and habit information in the scheduling information; and
if a match exists, automatically performing one or more of sending a push notification to the user using a habit and automatically joining the user to a communication;
after the communication is established, determining one or more in-meeting habits, and a meeting controller automatically applying the one or more in-meeting habits during the communication; and
after the communication is established the meeting controller monitoring one or more parameters comprising whether the communication is (a) internal with workers of the user, (b) external with clients or customers of the user, (c) with superiors of the user, or (d) with subordinates of the user, and wherein the meeting controller automatically changes a user device's settings during the meeting depending on one or more of parameters (a)-(d);
wherein the one or more in-meeting habits comprise one or more in-meeting changes of a user setting associated with the user and based on at least one attribute associated with the user.

12. The method of claim 11, further comprising a step of continuously monitoring in-meeting habits during the communication.

13. The method of claim 12, further comprising storing the in-meeting habits in the database.

14. The communication method of claim 11, wherein the push notification includes a meeting invitation and a meeting agenda that are sent to meeting participants, and that further includes the steps of permitting the meeting participants to (a) update the meeting agenda, and (b) communicate with each other via the meeting communication.

15. The communication method of claim 14 that further includes the step of providing a simulation mode whereby one or more of the participants can present meeting content to a communication system prior to the start of a meeting, and wherein the communication system applies rules of conformance to the meeting content and recommends changes to the meeting content.

16. The communication method of claim 11, wherein the meeting controller includes an interface, and that further includes the steps of an interface of the meeting controller (a) identifying during the meeting a video or audio factor that could disrupt the quality of the meeting, and (b) sending a message to a user responsible for the video or audio factor.

17. A communication method comprising the steps of:
joining a communication using a user device;
determining whether a habit for joining the communication for the user device exists;
if the habit for joining the communication exists, automatically joining the meeting using the habit; and
if the habit for joining the communication does not exist, determining a method used by the user device to connect to the communication and automatically updating a habit information with a habit corresponding to the method used, wherein a meeting controller determines a type of device of the user device;
monitoring one or more in-meeting habits during the communication, the one or more in-meeting habits comprising (a) one or more in-meeting changes of a user setting associated with the user device and related to at least one attribute associated with the user device, and (b) one or more habits related to a user's preference for sharing information or content during the communication, and (d) whether the user is a presenter, a participant, or an organizer;
after the communication is established the meeting controller monitoring one or more parameters comprising whether the communication is (a) internal with workers of the user, (b) external with clients or customers of the user, (c) with superiors of the user, or (d) with subordinates of the user, and wherein the meeting controller changes a user device's settings during the meeting depending on one or more of parameters (a)-(d); and
automatically changing settings on the user device based on whether the user is the presenter, the participant, or the organizer.

18. The method of claim 17, further comprising steps of determining meeting feedback and automatically sending the meeting feedback to one or more participants.

19. The method of claim 17, further comprising a step of providing measurable outcomes.

* * * * *